US008639016B2

(12) United States Patent
Frew

(10) Patent No.: US 8,639,016 B2
(45) Date of Patent: Jan. 28, 2014

(54) MOBILE COMMUNICATION DEVICE-BASED CHECK VERIFICATION

(75) Inventor: David Todd Frew, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 338 days.

(21) Appl. No.: 13/004,372

(22) Filed: Jan. 11, 2011

(65) Prior Publication Data

US 2012/0177281 A1 Jul. 12, 2012

(51) Int. Cl.
*G06K 9/00* (2006.01)
(52) U.S. Cl.
USPC .......................................... 382/137
(58) Field of Classification Search
USPC .......................................... 382/137
See application file for complete search history.

(56) References Cited

U.S. PATENT DOCUMENTS

| 7,458,508 | B1* | 12/2008 | Shao et al. ............... 235/380 |
| 7,500,607 | B2* | 3/2009 | Williams ................. 235/380 |
| 7,627,525 | B2* | 12/2009 | Williams ................. 705/39 |
| 2011/0091092 | A1* | 4/2011 | Nepomniachtchi et al. .. 382/139 |
| 2012/0101927 | A1* | 4/2012 | Leibon et al. ............ 705/35 |

* cited by examiner

*Primary Examiner* — Tom Y Lu
(74) *Attorney, Agent, or Firm* — Michael A. Springs; Moore & Van Allen PLLC; James C. Edwards

(57) ABSTRACT

Embodiments of the invention provide for mobile communication-based verification of the validity of negotiable checks. By verifying the validity of checks on a mobile communication device, the systems and methods provide for on-the-fly check verification regardless of where and/or at what time the check-related transaction occurs. The systems and methods validate the check in terms of insuring that the check is not fraudulent and, in some instances, providing certainty to the payee that the requisite funds currently exist in the related checking account. Additionally, the systems and methods provide for an efficient and readily identifiable means of conveying the outcome of the check verification process.

27 Claims, 4 Drawing Sheets

MOBILE COMMUNICATION DEVICE-BASED CHECK VERIFICATION

FIELD

In general, embodiments of the invention relate to financial transactions and, more particularly, verification of the validity of a check on a mobile communication device.

BACKGROUND

Typically, person-to-person payments are conducted with cash or personal checks. In most instances, the seller or service provider prefers cash since it offers a level of payment assurance not generally afforded to personal checks. Conversely, payment via personal checks is shrouded in uncertainty because the seller or service provider is unaware if the check is negotiable.

Negotiability of a personal check is brought into question due to issues such as fraud, insufficient funds and the like. Fraud may be exhibited in the form of a buyer trying to pass checks that they are not authorized to use (i.e., stolen checks or the like). Additionally, fraud may include passing invalid checks, such as counterfeit checks or mocked-up checks, in which the check stock, such as the routing number, account number or the like, has been nefariously altered. In other instance, fraud may involve trying to pass a check previously presented elsewhere.

Retailers attempt to circumvent problems associated with accepting personal checks by employing third party check guarantee services, such as TeleCheck® or the like. In practice, the retailer scans the check, sends the check data to the check guarantee service, which then compares the check data against industry-wide fraud databases to insure that the check is not associated with fraudulent activity.

In person-to-person payments, the payee desires the same level of confidence that the personal check is negotiable. Specifically, the payee desires a level of certainty that the check is not fraudulent and/or that sufficient funds exists in the related account. Person-to-person payments may be conducted at any point in time and at any location (e.g. paying for services provided in the home or paying for merchandise at a garage sale), as such the retail model, in which third party guarantee services require dedicated hardware, is not feasible in the person-to-person scenario.

Therefore, a need exists to develop systems, method and the like for verifying the validity of checks and, specifically, checks being used as payment in person-to-person transactions. As such the desired systems and methods such provide for on-the-fly check verification regardless of where and/or at what time the transaction occurs. The desired systems and methods should validate the check in terms of insuring that the check is not fraudulent and, in some instances, providing certainty to the payee that the requisite funds currently exist in the related checking account. Moreover, the desired systems and methods should provide the payee with an efficient and simplistic means of determining the validity of a check. In addition, to verifying the validity of the check, the desired systems and methods should allow for the payee to automatically deposit the check, in the event that the check is determined to be valid, thereby hastening actual payment of funds to the payee.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. The summary's sole purpose is to present some concepts of one or more embodiments in a simplified form as a prelude to the more detailed description that is presented later.

Thus, further details are provided below for a mobile device-based check verification system. The systems and methods herein provided leverage the fact that most individuals today use a mobile communication device, such as a smart phone or the like and that these mobile communication devices are typically equipped with imaging devices (i.e., cameras) and wireless network capabilities. Wireless network communication may include any known or future known mode of wireless communication include cellular communication, Wireless Local Area Network (WLAN), wi-fi, or the like. Such devices allow for a check recipient to capture an image of the check. The present invention extracts information from the check image and communicates the information and/or the image to internal or third party check guarantee services and/or financial institutions, which in turn perform checks to insure that the check is negotiable (i.e., non-fraudulent and/or sufficient funds exist). Based on responses from the check guarantee services and/or financial institutions, the mobile device is able to display or otherwise communicate a timely response to the validity inquiry, whereby the check recipient can be assured of the likelihood that the check is valid. Additionally, in the event that the check is deemed to be valid, the systems and methods herein disclosed provide for expediting clearing of the check by providing the recipient the ability to automatically deposit the check and to convert processing of the check to a more efficient processing means, such as Automated Clearing House (ACH) or the like.

A method for verifying validity of a negotiable check on a mobile communication device defines first embodiment of the invention. The method includes capturing, via a mobile communication device, an image of a negotiable check. The method further includes determining, via a computing device processor, a likelihood of validity of the negotiable check and providing, via the mobile communication device, an indication of the likelihood of validity of the negotiable check.

In specific embodiment of the method determining a likelihood of validity includes communicating, via the mobile communication device, at least one of the image or data on the image to one or more check verification services and receiving, via the mobile communication device, validity-related information from the one or more check verification services. The validity-related information is based on comparing data on the check to one or more fraud databases. In such embodiments, the one or more check verification services are further defined as at least one of a financial institution-based check verification service or a third-party-based check verification service. In further related embodiments, in the event two or more check verification systems are implemented, the method includes synthesizing, via a computing device processor, the validity-related information received from the two or more check verification systems to provide for the likelihood of validity of the negotiable check.

In other specific embodiments of the method determining a likelihood of validity includes communicating, via the mobile communication device, at least one of the image or data on the image to a financial institution associated with the negotiable check and receiving, via the mobile communication device, account sufficiency information from the financial institution, wherein the account sufficiency information is based on comparing an amount of the negotiable check to a check account balance. In such embodiments, determining may also include the aforementioned communicating, via the mobile communication device, at least one of the image or data on the image to one or more check verification services and receiving, via the mobile communication device, validity-related information from the one or more check verification services. In further related embodiments, in which two or more check guarantee systems or financial institutions are implemented, the method includes synthesizing, via a computing device processor, the validity-related information received from one or more check verification systems and the financial institution to provide for the likelihood of validity of the negotiable check.

In other specific embodiments of the method, providing an indication of the likelihood of validity includes providing, via the mobile communication device, a visual display that indicates a state of the likelihood of validity, such that the state is one of (a) likely to be valid, (b) likely to be invalid, or (c) insufficient validity-related information exists to determine the likelihood of validity. In further specific embodiments, the state of the likelihood of validity is provided as a color-coded display.

Moreover, in additional specific embodiments of the method, providing an indication of the likelihood of validity includes determining, via a computing device processor, a validity score based on at least one of one or more check fraud verifications or a check account balance verification, converting, via a computing device processor, the validity score to a state of the likelihood of validity based on one or more validity score thresholds and providing, via the mobile communication device, a visual display of the state of the likelihood of validity.

In still further embodiments the method includes providing, via the mobile communication device, a deposit option if the indication of the likelihood of validity meets depositing criteria. In such embodiments the method may further include receiving, via the mobile communication device, a deposit input that authorizes deposit of the negotiable check. In further such embodiments the method may include converting, via computing device processor, the negotiable check from image processing to automated clearing house (ACH) transaction processing upon deposit authorization.

A mobile communication device defines second embodiments of invention. The device includes a computing platform including at least one processor and a memory. The device further includes an image capture device in communication with the processor and configured to capture an image of a negotiable check. The device additionally includes a check verification module stored in the memory, executable by the processor and configured to provide for a likelihood of validity of the negotiable check and provide an indication of the likelihood of validity of the negotiable check.

In specific embodiments of the device, the check verification module is further configured to communicate at least one of the image or data on the image to one or more check verification services and receive validity-related information from the one or more check verification services. The validity-related information is based on comparing data on the check to one or more fraud databases. In such embodiments of the device, the one or more check verification services are further defined as at least one of a financial institution-based check verification service or a third-party-based check verification service. In further such embodiments, in which two or more check verification systems are implemented, the method includes synthesize the validity-related information received from two or more check verification systems to provide for the likelihood of validity of the negotiable check.

In other specific embodiments of the device, the check verification module is further configured to communicate at least one of the image or data on the image to a financial institution associated with the negotiable check and receive account sufficiency information from the financial institution. The account sufficiency information is based on comparing an amount of the negotiable check to a check account balance. In such embodiments of the device, the check verification module may be configured to communicate at least one of the image or data on the image to one or more check verification services and receive validity-related information from the one or more check verification services. In further related embodiments, in which two or more check guarantee systems or financial institutions are implemented, the check guarantee service may be configured to synthesize the validity-related information received from one or more check verification systems and the financial institution to provide for the likelihood of validity of the negotiable check.

In further related embodiments of the device, the check verification module is further configured provide a visual display that indicates a state of the likelihood of validity, such that the state is one of (a) likely to be valid, (b) likely to be invalid, or (c) insufficient validity-related information exists to determine the likelihood of validity. In such embodiments of the device, the check verification module is further configured to provide the visual display, wherein the state of the likelihood of validity is color-coded.

Moreover, in other specific embodiments of the device the check verification module is further configured to either receive or determine a validity score based on at least one of one or more check fraud verifications or a check account balance verification, convert the validity score to a state of the likelihood of validity based on one or more validity score thresholds and provide the indication as a visual display of the state of the likelihood of validity.

In additional embodiments the device may further include a mobile banking module stored in the memory, executable by the processor and configured to provide a deposit option for depositing the negotiable check. In such embodiments, the mobile banking module is in communication with the check verification muddle and is configured to receive the indication of the likelihood of validity, determine if the indication meets depositing criteria and provide the deposit option if the depositing criteria is met. In further related embodiments, the mobile banking module is further configured to receive a deposit input that authorizes deposit of the negotiable check. In additional related embodiments, the mobile banking module provides for converting the negotiable check from image processing to automated clearing house (ACH) transaction processing upon deposit authorization.

A computer program product including a non-transitory computer-readable medium provides for third embodiments of the invention. The computer-readable medium includes a first set of codes for causing a mobile communication device to capture an image of a negotiable check. The computer-readable medium additionally includes a second set of codes for causing the mobile communication device to provide for a likelihood of validity of the negotiable check based on capturing the image. In addition, the computer-readable medium includes a third set of codes for causing the mobile communication device to provide an indication of the likelihood of validity of the negotiable check.

Thus, as described in further detail below, embodiments of the invention provide for mobile communication-based systems and methods for verifying the validity of negotiable checks. By verifying the validity of checks on a mobile communication device, the systems and methods provide for onthe-fly check verification regardless of where and/or at what time the transaction occurs. The systems and methods validate the check in terms of insuring that the check is not fraudulent and, in some instances, providing certainty to the payee that the requisite funds currently exist in the related checking account. Additionally, the systems and methods provide for an efficient and readily identifiable means of conveying the outcome of the check verification process. In addition, to verifying the validity of the check, the systems and methods allow for the payee to automatically deposit the check, in the event that the check is determined to be valid, thereby hastening actual payment of funds to the payee.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
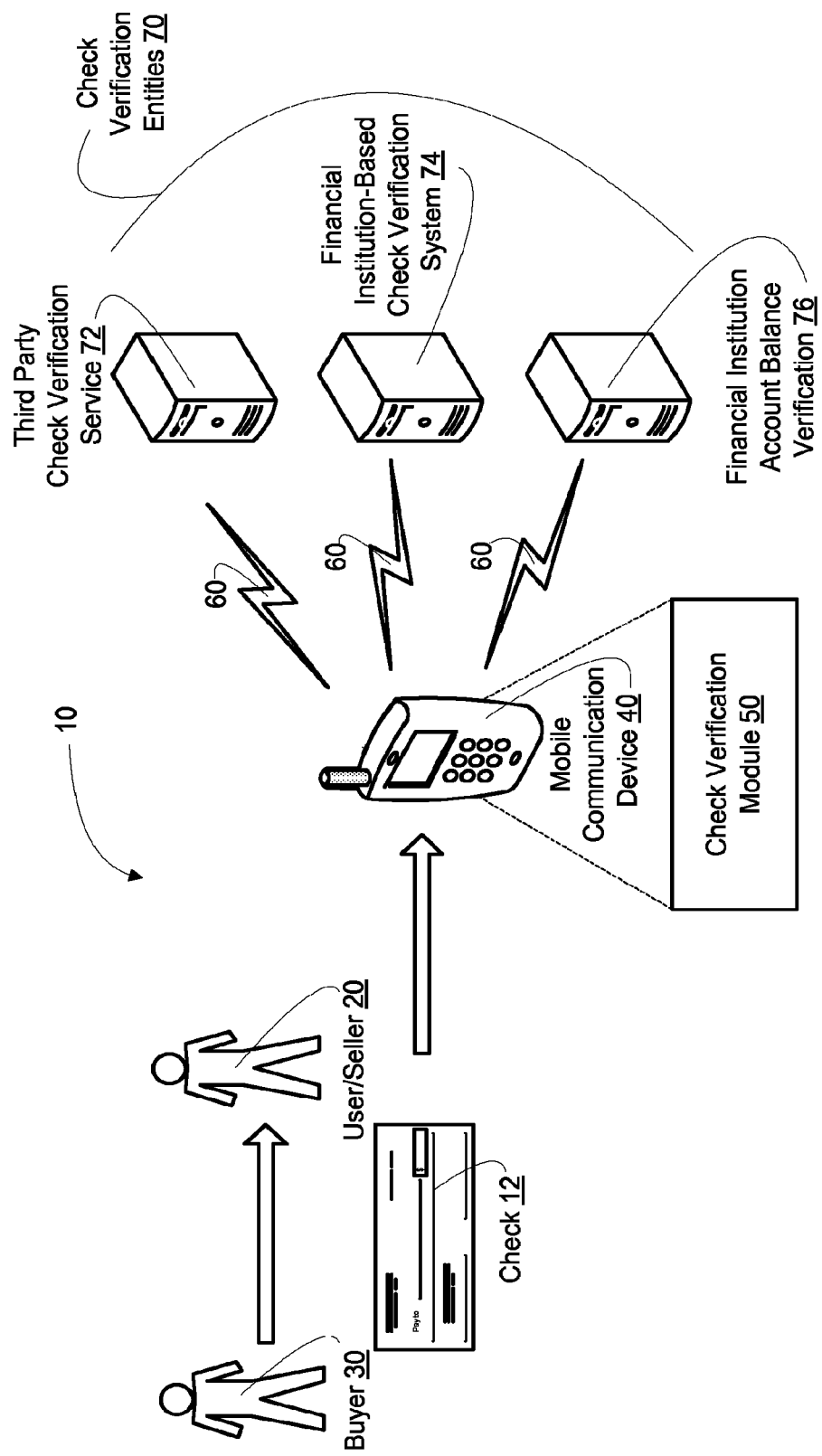
Figure 2:
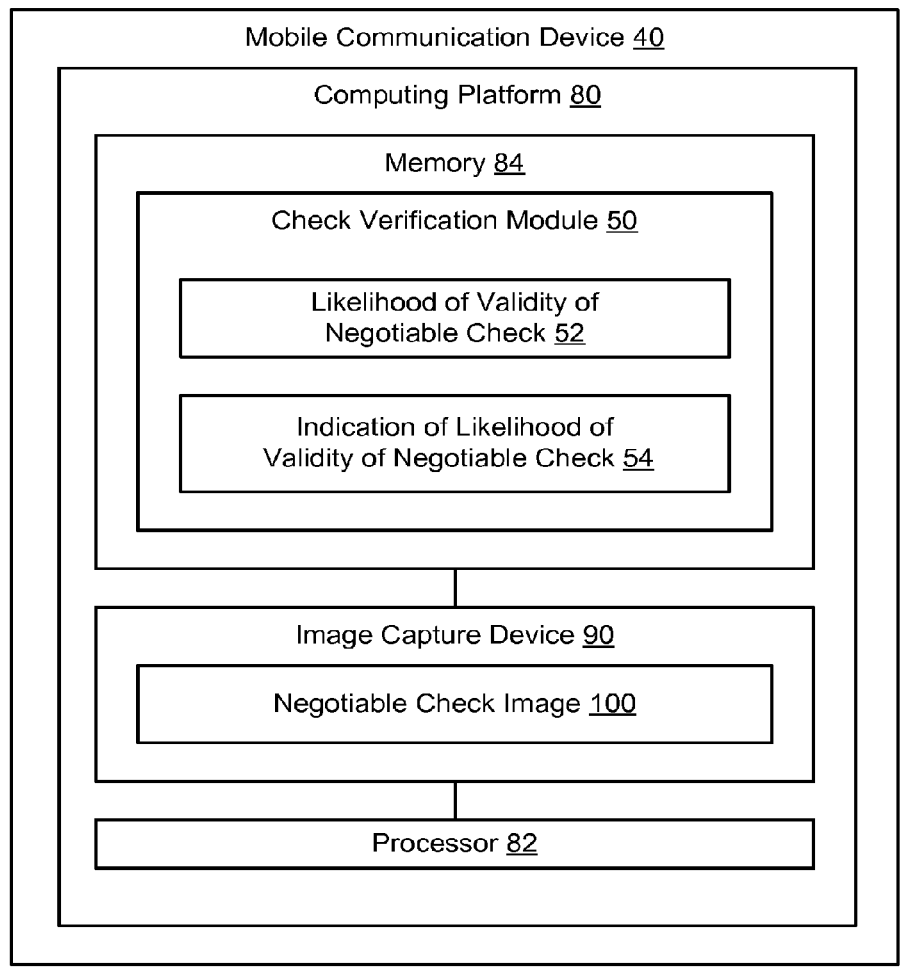
Figure 3:
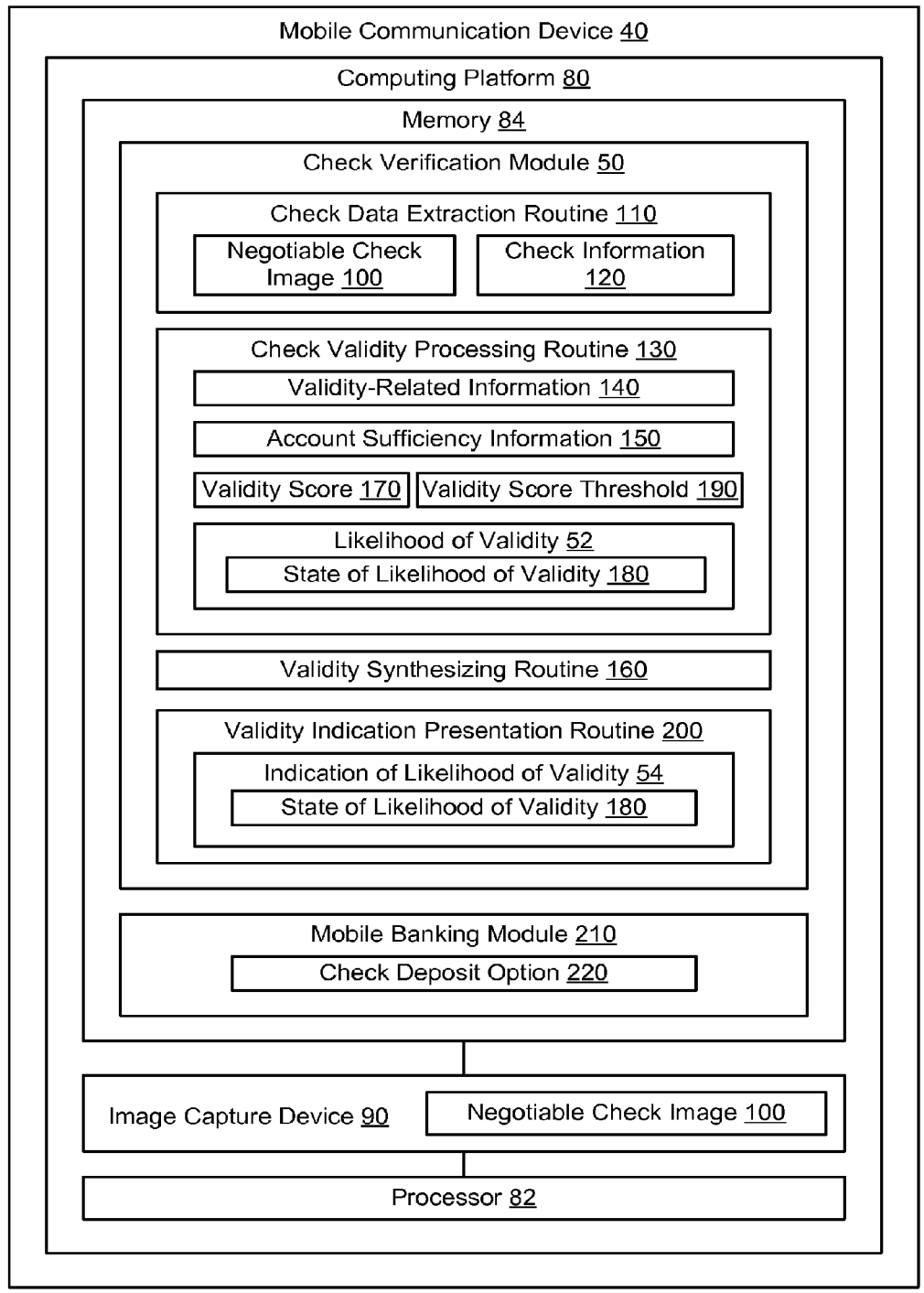
Figure 4:
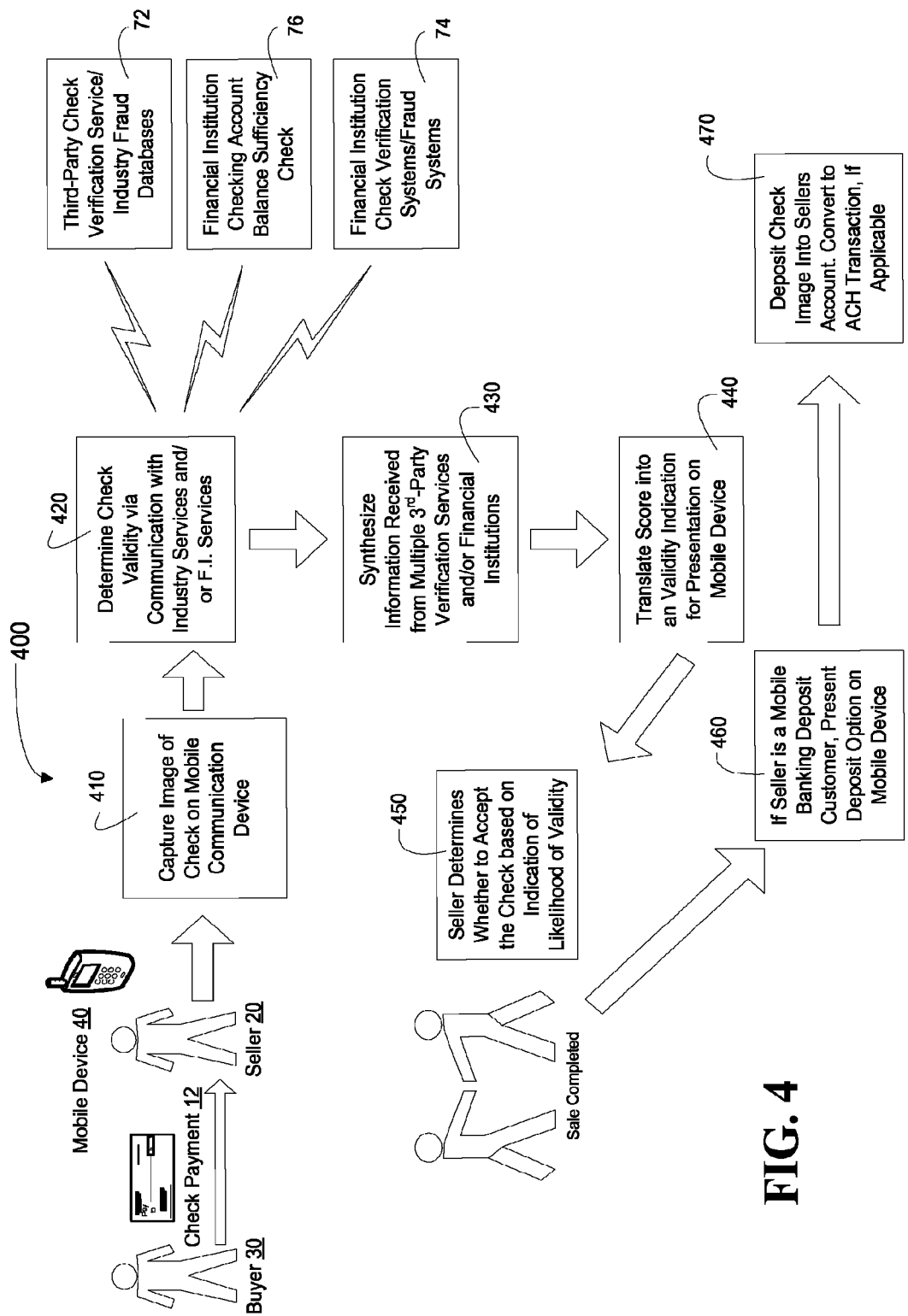

Having thus described embodiments of the invention in general terms, reference may now be made to the accompanying drawings:

FIG. 1 is a schematic diagram of a system for mobile communication device-based check verification; in accordance with embodiments of the present invention;

FIG. 2 is a block diagram of a mobile communication device configured to provide check verification, in accordance with embodiments of the present invention;

FIG. 3 is a more detailed block diagram of a mobile communication device configured to provide check verification, in accordance with embodiments of the present invention; and FIG. 4 is flow diagram of a method for mobile communication device-based check verification, in accordance with present embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, device, or propagation medium. More specific examples of the computer readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Referring to FIG. 1 shown is a schematic diagram of a system 10 for mobile communication device-based check verification, in accordance with embodiments of the present invention. The user 20, otherwise referred to as the seller or service provider receives a check 12 from a buyer 30 or service providee. The user 10 implements their mobile communication device 40, such as a smart phone equipped with a camera or the like, to capture an image of the check. Once the image of the check is captured, the mobile communication device executes a check verification module 50 to provide for the likelihood of validity of the negotiable check. The module/application initiates network communication via wireless link 60 with one or more check verification entities 70. The check verification entities may include, but are not necessarily limited to, third-party check verification services 72, financial institution-based check verification systems 74, and financial institution account balance verification 76. Based on information returned from the one or more check verification entities 70, the check validity module 50 provides for the likelihood of validity of the check and provides for an indication of the likelihood of validity of the mobile communication device 40. The indication of the likelihood of validity may be a visual display illustrating whether the check is (a) likely to be valid; (b) likely to be invalid or (c) insufficient information exists to determine the likelihood of validity. Based on the indication of validity presented to user 10, the user can decide to accept or decline acceptance of the check from the buyer/service provide.

FIG. 2 is a block diagram of the mobile communication device 40 configured to verify the validity of a negotiable check, in accordance with embodiments of the present invention. The mobile communication device 40 includes a computing platform 80 having at least one processor 82 and a memory 84 in communication with the processor. In addition, mobile communication device 40 includes image capture device 90 executable by processor 84 and configured to capture and store images, such as a negotiable check image 100. Thus, the mobile communication device 40 may take the form of a smart phone equipped with a camera, a personal digital assistant (PDA) equipped with image capture capabilities, a laptop/portable computer equipped with image capture capabilities or the like.

The memory 84 of mobile communication device 40 stores check verification module 50. Check verification module 50 is executable by processor 82 and configured to provide for a likelihood of validity 52 of a negotiable check and provide an indication 54 of the likelihood of the validity of the negotiable check.

FIG. 3 proves a more detailed block diagram of a mobile communication device 40 configured to verify the validity of a negotiable check, in accordance with embodiments of the present invention. As previously noted, the mobile communication device 40 includes a computing platform 80 having at least one processor 82 and a memory 84 in communication with the processor. The computing platform 80 is operable to receive and execute modules, routines and applications, such as check verification module 50 or the like. Computing platform 80 includes memory 84, which may comprise volatile and nonvolatile memory such as read-only and/or random-access memory (RAM and ROM), EPROM, EEPROM, flash cards, or any memory common to computing platforms. Further, memory 84 may include one or more flash memory cells, or may be any secondary or tertiary storage device, such as magnetic media, optical media, tape, or soft or hard disk.

Further, computing platform 80 also includes processor 82, which may be an application-specific integrated circuit ("ASIC"), or other chipset, processor, logic circuit, or other data processing device. Processor 82 or other processor such as ASIC may execute an application programming interface ("API") layer that interfaces with any resident programs, such as impacted check verification module 50 or the like, stored in the memory 84 of mobile communication device 40.

Processor 82 includes various processing subsystems embodied in hardware, firmware, software, and combinations thereof, that enable the functionality of mobile communication device 40 and the operability of the device on a network. For example, processing subsystems allow for initiating and maintaining communications, and exchanging data, with other networked devices. It should be noted that any of the tools, modules, sub-modules, and routines shown and described as being in memory 84 may alternatively be embodied in processing subsystems.

The check verification module 50 may include check data extraction routine 110 that is configured to extract the necessary check information 120 from a negotiable check image 100. The necessary check information 120 is defined as the information on the check needed to determine the likelihood of validity of the check. As such, the necessary information may include, but is not limited to, the Magnetic Ink Character Recognition Data (MICR) data, such as bank/routing number, personal account number, serial number and the like; the amount of the check, the name of the check author, the signature of the check author and the like.

Further, check verification module 50 includes validity processing routine 130 configured to provide for the likelihood of validity 52 of the negotiable check. In specific embodiments of the invention the validity determining routine 130 is configured to communicate the check image 100 and/or the necessary check information 120 to one or more third party check verification systems, such as TeleCheck® or the like (shown in FIG. 1). The third party check verification system compares the necessary information from the check to data stored in industry fraud databases to determine if the check is fraudulent. In specific embodiments, the third party check verification systems are capable of determining if the check is associated with a known fraud ring, if the check has been altered or is otherwise counterfeit, if the check has been previously presented, if the check is for an amount in excess of typical amounts for that particular personal account, and the like. As such, the validity determining routine 130 is further configured to receive validity-related information 140 from the third party check verification services.

In further embodiments of the invention, the validity determining routine 130 is configured to communicate the check image 100 and/or the necessary check information 120 to one or more financial institution-based check verification systems (shown in FIG. 1). Similar to the third party check verification systems, the financial institution-based check verification systems compare the necessary information 120 from the check to data stored in financial institution fraud databases to determine if the check is fraudulent. In specific embodiments, the financial institution-based check verification systems are capable of determining if the check is associated with a known fraud ring, if the check has been altered or is otherwise counterfeit, if the check has been previously presented, if the check is for an amount in excess of typical amounts for that particular personal account, and the like. As such, the validity determining routine 130 is further configured to receive the validity-related information 140 from the financial institution-based check verification systems.

It should be noted, that in those embodiments of the invention in which the mobile communication device-based check verification system is offered by a financial institution to customers or non-customers, the financial institution-based check verification system may be a system implemented by the offering financial institution. Alternatively, the financial institution-based check verification system may be a system implemented by another financial institution. For example, the financial institution-based check verification system that is used to provide for the likelihood of validity may be implemented by the financial institution associated with the negotiable check (i.e., the payor's bank or the like).

In still further embodiments of the invention the validity determining routine 130 is configured to communicate the necessary check information 120, such as the account number and check amount to a financial institution (as shown in FIG. 1) for check account balance inquiry. While the balance inquiry does not necessarily guarantee that the necessary funds will be in the account at the subsequent time of posting, the check account balance inquiry can assure that the check amount currently exists in the associated account. As such, the validity determining routine 130 is further configured to receive the account sufficiency information 150 from the financial institution.

In those embodiments in which the validity determining routine 130 relies on any combination of more than one third party check verification service, financial institution-based check verification systems and/or financial institution account balance inquiry, the check verification module 50 may further include a validity synthesizing routine 160 configured to synthesize the validity-related information 140 received from the third party check verification service(s), the validity-related information 140 received from the financial institution-based check verification system(s) and/or the account sufficiency information 150 to provide the likelihood of validity 52 of the negotiable check.

In specific embodiments of the invention, the validity determining routine 130 may be configured to receive or determine a validity score 170 based on validity-related information 140 received from the check fraud verifications and/or an account sufficiency information 150 received from the financial institution. The determination of the validity score 170 may be a result of the validity synthesizing routine 160. Further, the validity score may be converted to a state 180 of the likelihood of validity based on one or more validity score thresholds 190. The state 180 may be, but is not limited to, (a) likely to be valid; (b) likely to be invalid or (c) insufficient information exists to determine the likelihood of validity. Thus, a predetermined validity score 170 may serve as the validity score threshold 190 for determining if the state 180 is (a) likely to be valid or (b) likely to be invalid.

Check verification module 50 additionally includes indication presentation routine 200 configured to present an indication 54 of the likelihood of validity of the check. The indication 54 may take the form of a visual display on the mobile communication device 40 that indicates the state 180 of the likelihood of validity. As previously noted the state 180 may include, but is not necessarily limited to, (a) likely to be valid; (b) likely to be invalid or (c) insufficient information exists to determine the likelihood of validity. In further specific embodiments of the invention the state 180 may be color-coded, for example green indicates (a) likely to be valid; red indicates (b) likely to be invalid and yellow indicates (c) insufficient information exists to determine the likelihood of validity.

In optional embodiments of the invention, the mobile communication device 40 may include a mobile banking module 210 stored in the memory 84 and executable by the processor 82. In addition to performing convention mobile banking operations, the mobile banking module 210 may be linked to the check verification module 50 such that the mobile banking module 210 or check verification module 50 is configured to present a check deposit option 220 to the user via the mobile communication device 40. The check deposit option 210 may be configured to be presented only if the check is determined to meet necessary depositing criteria, such as if the check is determined by the check verification module 50 to be likely valid. The user/buyer/service provider may predetermine the account to which the check is to be deposited or the system may be configured to allow the user to select the account to which the deposit is to be made at the time of the deposit. By initiating the deposit of the check on the mobile communication device 40, the user/seller/service provider does not have to physically present the check to the financial institution. In addition, initiating deposit of the check on the mobile communication device provides hastening the overall process of clearing the check and making payment available to the user/seller/service provider. In addition to depositing the check the mobile banking module 210 may be configured to convert the check for a check/image processing transaction to an Automated Clearing House (ACH) processing transaction as a further means of expediting the overall clearing process.

Referring to FIG. 4 a flow diagram is presented of a method 400 for mobile communication device-based check verification, in accordance with embodiments of the present invention. The buyer 30 presents a check 12 to the seller as a means of payment for goods or services provided by the seller 20. The seller is in possession of mobile communication device 40, which is configured to provide for verification of validity of checks.

In one specific business model, a financial institution may be the provider of the check verification service. The financial institution may provide the check verification service to customers and/or non-customers. In specific models, the financial institution may provide the check verification service as a fee-based service. The fee structure may be based on a percentage of the total amount of the check, a flat fee, a time-period fee (e.g., monthly fee or the like) or any other feasible fee structure. In other models, the service may be provided free-of-charge to customers as part of an overall product/service bundle.

At Event 410, the seller 20 captures an image of the check on their mobile communication device 40. The check verification module being executed on the mobile communication device may require extraction of data from the check prior to determining the likelihood of validity of the check. Extraction of data may include, but is not limited to, the MICR data (e.g., routing number, account number, serial number), the check amount, the name associated with the account, the signature and the like.

At Event 420, the check validity is determined via wireless network communication with one or more industry services and/or bank services. As previously discussed, the check verification entities 70 may include, but are not limited to, third-party check verification services 72, financial institution-based check verification system 74 and/or financial institution account balance sufficiency check 76. The third-party check verification systems receive a request from the mobile communication device 40, which includes the image and/or the image data and compares the image data to industry fraud databases to determine the likelihood that the check is associated with fraudulent activity. Based on the results of the comparison, the third-party check verification service returns a check validity response to the mobile communication device. In a similar fashion, the financial institution-based check verification systems receive a request from the mobile communication device 40, which includes the image and/or the image data and compares the image data to financial institution fraud databases to determine the likelihood that the check is associated with fraudulent activity. The fraud checks may include, but are not limited to, verifying the check stock is valid, verifying the signature, insuring that the account is open, insuring that the specific check has not been stopped/previously presented and the like. Based on the results of the comparison, the financial institution-based check verification system returns a check validity response to the mobile communication device.

The financial institution check account balance verification receives a request from the mobile communication device 40, which includes image data, such as check amount and account number. The financial institution compares the check amount to the current balance in the associated account to determine if adequate funds currently reside in the account to cover the amount of the check. Based on the results of the comparison, the financial institution returns an amount sufficiency response to the mobile communication device. The financial institution check account balance sufficiency check may be employed if the check being verified is from the financial institution implementing the check verification system or if the financial institution otherwise has access to account balance information at other financial institutions.

At Event 430, if more than check verification service/system or account sufficiency check is employed in the verification or if the data returned from such services/system requires such, the information received from the services/systems is synthesized to evaluate the likelihood of validity of the check. In one embodiment synthesizing may include converting the information received in the responses into a comprehensive validity score.

At Event 440 the score may be converted into a validity indication and presented on the mobile communication device 40. In specific embodiments, converting the validity score may include comparing the validity score to validity score thresholds and determining a state of the likelihood of validity based on the score meeting/exceeding a threshold. The states may include (a) likely to be valid; (b) likely to be invalid; (c) insufficient data to determine likelihood of validity and the like. In specific embodiments of the invention, the states of the likelihood of validity are visually displayed on the mobile communication device and, in specific embodiments, color-coded, such that, for example, green indicates green indicates (a) likely to be valid; red indicates (b) likely to be invalid; and yellow indicates (c) insufficient data to determine likelihood of validity.

At Event 450, based on the indication of validity provided on the mobile communication device, the seller 20 determines whether to accept the check and consummate the transaction. If the indication is that the check is likely invalid, the seller 20 may refuse the check and demand payment in another form, such as cash. If the indication is that the check is likely valid, the seller 20 may accept the check as payment. In the event that the indication of validity is that insufficient data is available to determine the likelihood of validity, the seller may or may not agree to accept the check.

At Event 460, if the seller agrees to accept the check and the seller is a mobile banking deposit customer, the mobile banking application may provide for a deposit option, whereby upon acceptance by the seller the check is automatic deposited in the seller's account of choice, without the need to physically present the check to the financial institution. The seller's account of choice may be predetermined or the seller may designate the account upon acceptance of the deposit option. In certain embodiments, the mobile banking application is linked to the check verification system, such that only those checks determined to be likely valid are provided the check deposit option.

At Event 470, if the seller has chosen to activate the deposit option, the check image and/or associated data is deposited into the seller's account of choice and, if applicable, the check may be converted to an automated clearing house processing transaction to further hasten the processing/clearing of the check for the seller.

Thus, present embodiments herein disclosed provide for mobile communication-based systems and methods for verifying the validity of negotiable checks. By verifying the validity of checks on a mobile communication device, the systems and methods provide for on-the-fly check verification regardless of where and/or at what time the transaction occurs. The systems and methods validate the check in terms of insuring that the check is not fraudulent and, in some instances, providing certainty to the payee that the requisite funds currently exist in the related checking account. Additionally, the systems and methods provide for an efficient and readily identifiable means of conveying the outcome of the check verification process. In addition, to verifying the validity of the check, the systems and methods allow for the payee to automatically deposit the check, in the event that the check is determined to be valid, thereby hastening actual payment of funds to the payee.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for verifying a likelihood of validity of a negotiable check on a mobile communication device, the method comprising:

capturing, by a mobile communication device, an image of a negotiable check;

determining, by a computing device processor, a likelihood of validity of the negotiable check by (1) communicating, from the mobile communication device via a wireless network, at least one of the image or data on the image to one or more check verification services and (2) receiving, at the mobile communication device, validity-related information from one or more of the check verification services, wherein the validity-related information is based on comparing data on the check to at least one fraud database;

determining, by a computing device processor, account sufficiency of an amount of the negotiable check by (1) communicating, from the mobile communication device via a wireless network, at least one of the image or data on the image to a financial institution associated with the negotiable check and (2) receiving, at the mobile communication device, account sufficiency information from the financial institution, wherein the account sufficiency information is based on comparing the amount of the negotiable check to a current payment account balance;

providing, by the mobile communication device, an indication to a user of a state of the likelihood of validity of the negotiable check based on the validity-related information and the account sufficiency information, wherein the state is one of (1) likely to be valid, (2) likely to be invalid, or (3) insufficient validity-related information exists to determine the likelihood of validity.

2. The method of claim 1, wherein the one or more check verification services are further defined as at least one of a financial institution-based check verification service or a third-party-based check verification service.

3. The method of claim 1, further comprising synthesizing, by a computing device processor, the validity-related information received from two or more check verification systems to determine the likelihood of validity of the negotiable check.

4. The method of claim 1, further comprising synthesizing, by a computing device processor, the validity-related information received from one or more check verification systems and the account sufficiency information from the financial institution to determine the likelihood of validity of the negotiable check.

5. The method of claim 1, wherein providing further comprises providing, by the mobile communication device, a visual display of the state of the likelihood of validity of the negotiable check, wherein the state of the likelihood of validity is color-coded.

6. The method of claim 1, wherein providing further comprises:
 determining, via a computing device processor, a validity score based on the validity related information and the account sufficiency information;
 converting, via a computing device processor, the validity score to the state of the likelihood of validity based on one or more validity score thresholds; and
 providing, via the mobile communication device, a visual display of the state of the likelihood of validity.

7. The method of claim 1, further comprising, in response to providing an indication that the negotiable check is likely to be valid, providing, by the mobile communication device, a deposit option configured to allow the user to automatically deposit the negotiable check into a user-designated account.

8. The method of claim 7, further comprising receiving, by the mobile communication device, a deposit input that authorizes automatic deposit of the negotiable check to the user-designated account.

9. The method of claim 8, further comprising converting, by computing device processor, the negotiable check from image processing to automated clearing house (ACH) transaction processing upon deposit authorization.

10. A mobile communication device, the device comprising:
 a computing platform including at least one processor and a memory;
 an image capture device in communication with the processor and configured to capture an image of a negotiable check; and
 a check verification module stored in the memory, executable by the processor and configured to:
  determine a likelihood of validity of the negotiable check by (1) communicating, from the mobile communication device via a wireless network, at least one of the image or data on the image to one or more check verification services and (2) receiving, at the mobile communication device, validity-related information from one or more of the check verification services, wherein the validity-related information is based on comparing data on the check to at least one fraud database,
  determine account sufficiency of an amount of the negotiable check by (1) communicating, from the mobile communication device via a wireless network, at least one of the image or data on the image to a financial institution associated with the negotiable check and (2) receiving, at the mobile communication device, account sufficiency information from the financial institution, wherein the account sufficiency information is based on comparing the amount of the negotiable check to a current payment account balance, and
  provide an indication to a user of a state of the likelihood of validity of the negotiable check based on the validity-related information and the account sufficiency information, wherein the state is one of (1) likely to be valid, (2) likely to be invalid, or (3) insufficient validity-related information exists to determine the likelihood of validity.

11. The mobile communication device of claim 10, wherein the one or more check verification services are further defined as at least one of a financial institution-based check verification service or a third-party-based check verification service.

12. The mobile communication device of claim 10, wherein the check verification module is further configured to synthesize the validity-related information received from two or more check verification systems to provide for the likelihood of validity of the negotiable check.

13. The mobile communication device of claim 10, wherein the check verification module is further configured to synthesize the validity-related information received from one or more check verification systems and the account sufficiency information from the financial institution to provide for the likelihood of validity of the negotiable check.

14. The mobile communication device of claim 10, wherein the check verification module is further configured to provide a visual display of the indication of the state of the likelihood of validity of the negotiable check, wherein the indication of the state of the likelihood of validity is color-coded.

15. The mobile communication device of claim 10, wherein the check verification module is further configured to either receive or determine a validity score based on the validity related information and the account sufficiency information, convert the validity score to the state of the likelihood of validity based on one or more validity score thresholds and provide the indication as a visual display of the state of the likelihood of validity.

16. The mobile communication device of claim 10, further comprising a mobile banking module stored in the memory, executable by the processor and configured to, in response to providing an indication that the negotiable check is likely to be valid, provide a deposit option configured to allow the user to automatically deposit the negotiable check into a user-designated account.

17. The mobile communication device of claim 16, wherein the mobile banking module is further configured to receive a deposit input that authorizes automatic deposit of the negotiable check to the user-designated account.

18. The mobile communication device of claim 17, wherein the mobile banking module provides for converting the negotiable check from image processing to automated clearing house (ACH) transaction processing upon deposit authorization.

19. A computer program product comprising:
 a non-transitory computer-readable medium comprising:
  a first set of codes for causing a mobile communication device to capture an image of a negotiable check;
  a second set of codes for causing the mobile communication device, in response to capturing the image, to determine a likelihood of validity of the negotiable check by (1) communicating, from the mobile communication device via a wireless network, at least one of the image or data on the image to one or more check verification services and (2) receiving, at the mobile communication device, validity-related information from one or more of the check verification services, wherein the validity-related information is based on comparing data on the check to at least one fraud database;

a third set of codes for causing the mobile communication device to determine account sufficiency of an amount of the negotiable check by (1) communicating, from the mobile communication device via a wireless network, at least one of the image or data on the image to a financial institution associated with the negotiable check and (2) receiving, at the mobile communication device, account sufficiency information from the financial institution, wherein the account sufficiency information is based on comparing the amount of the negotiable check to a current payment account balance; and a fourth set of codes for causing the mobile communication device to provide an indication to a user of a state of the likelihood of validity of the negotiable check based on the validity-related information and the account sufficiency information, wherein the state is one of (1) likely to be valid, (2) likely to be invalid, or (3) insufficient validity-related information exists to determine the likelihood of validity.

20. The computer program product of claim 19, wherein the one or more check verification services are further defined as at least one of a financial institution-based check verification service or a third-party-based check verification service.

21. The computer program product of claim 19, further comprising a fifth set of codes for causing the mobile communication device to synthesize the validity-related information received from two or more check verification systems to provide for the likelihood of validity of the negotiable check.

22. The computer program product of claim 19, further comprising a fifth set of codes for the mobile communication device to synthesize the validity-related information received from one or more check verification systems and the financial institution to provide for the likelihood of validity of the negotiable check.

23. The computer program product of claim 19, wherein the third set of codes is further configured to cause the mobile communication device to provide a visual display of the indication of the state of the likelihood of validity of the negotiable check, wherein the indication of the state of the likelihood of validity is color-coded.

24. The computer program product of claim 19, further comprising a fifth set of codes configured to cause the mobile communication device to provide for a validity score based on the validity related information and the account sufficiency information, convert the validity score to the state of the likelihood of validity based on one or more validity score thresholds and provide a visual display of the state of the likelihood of validity.

25. The computer program product of claim 19, further comprising a fifth set of codes for causing the mobile communication device, in response to providing an indication that the negotiable check is likely to be valid, to provide for a deposit option configured to allow the user to automatically deposit the negotiable check into a user-designated account.

26. The computer program product of claim 25, further comprising a sixth set of codes for causing the mobile communication device receive a deposit input that authorizes automatic deposit of the negotiable check to the user-designated account.

27. The computer program product of claim 26, further comprising a seventh set of codes for causing a computer to convert processing of the negotiable check from image to automated clearing house (ACH) upon deposit authorization.

* * * * *